United States Patent
Uryu et al.

(10) Patent No.: US 7,323,866 B1
(45) Date of Patent: Jan. 29, 2008

(54) ROTATION ANGLE DETECTION APPARATUS

(75) Inventors: Takuya Uryu, Tokyo (JP); Kazuhisa Kurita, Tokyo (JP); Katsunari Takagi, Tokyo (JP); Teruhiko Moriguchi, Tokyo (JP); Yoshihiko Onishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/730,646

(22) Filed: Apr. 3, 2007

(30) Foreign Application Priority Data

Nov. 21, 2006 (JP) ............................. 2006-314283

(51) Int. Cl.
*G01B 7/30* (2006.01)

(52) U.S. Cl. ................................. 324/207.25

(58) Field of Classification Search .......... 324/207.25, 324/173–174; 73/514.31, 514.39
See application file for complete search history.

(56) References Cited

U.S. PATENT DOCUMENTS

2005/0073299 A1* 4/2005 Yoshikawa et al. .... 324/207.25

FOREIGN PATENT DOCUMENTS

JP 2004-84503 A 3/2004
JP 2005-233768 A 9/2005

* cited by examiner

*Primary Examiner*—Bot LeDynh
(74) *Attorney, Agent, or Firm*—Sughrue Mion, PLLC

(57) ABSTRACT

A rotation angle detection apparatus is capable of preventing an eddy current and radio wave noise from being transmitted from outside to a yoke and a permanent magnet through a metal plate, and thence to a non-contact sensor through radiation as it is. The apparatus includes a yoke, a permanent magnet that is arranged on an inner wall surface with magnetic flux flowing from its N pole to its S pole through an inner space thereof, a metal plate formed integral with the yoke and the permanent magnet through a resin by insert molding, and a non-contact sensor arranged in the inner space of the permanent magnet. Between the metal plate and the individual end faces of the yoke and the permanent magnet, there is interposed a high impedance member that prevents radio wave noise from flowing from the metal plate to the yoke and the permanent magnet.

8 Claims, 5 Drawing Sheets

ROTATION ANGLE DETECTION APPARATUS

BACKGROUND OF THE INVENTION

1. Field of the Invention

The present invention relates to a rotation angle detection apparatus having a non-contact sensor that detects the rotation angle of a rotating member by detecting a change in the azimuth of magnetic flux.

2. Description of the Related Art

In the past, as a rotation angle detection apparatus for detecting the rotational angle of a throttle valve, there has been known one which includes a gear wheel that is formed by insert molding a metal plate made of a cup-shaped non-magnetic material into the interior thereof, a permanent magnet and a yoke that are fitted into a notched portion formed in a central portion of the gear wheel, and a non-contact sensor that is fixedly secured to a non-rotating member, wherein the rotation angle of the rotating member is detected by detecting a change in the azimuth of the magnetic flux lines of the permanent magnet that is rotating together with the rotation of the gear wheel by means of the non-contact sensor (see, for example, a first patent document: Japanese patent application laid-open No. 2005-233768 (Paragraph No. 0019, FIG. 13)).

However, with the above-mentioned rotation angle detection apparatus, the end faces of the permanent magnet and the yoke are in abutment with the metal plate, so there is the following problem. That is, an eddy current, which is generated in the body of the detection apparatus under the action of electromagnetic waves from the outside, and/or radio wave noise from a drive motor are transmitted to the yoke and the permanent magnet through a throttle shaft and the metal plate, from where they are propagated through radiation to the non-contact sensor as it is, thus resulting in a factor for malfunction of the non-contact sensor.

SUMMARY OF THE INVENTION

Accordingly, the present invention is intended to obviate the problems as referred to above, and has for its object to obtain a rotation angle detection apparatus which is capable of preventing an eddy current and radio wave noise from being transmitted from outside to a yoke and a permanent magnet through a metal plate, and thence to a non-contact sensor through radiation as it is.

Bearing the above object in mind, according to the present invention, there is provided a rotation angle detection apparatus which includes: a permanent magnet of a cylindrical shape in which magnetic flux flows from its N pole to its S pole through an inner space thereof; a metal plate that is fixedly secured to a rotating member and is integrated with the permanent magnet through a resin by means of insert molding; and a non-contact sensor that is arranged in the inner space of the permanent magnet. The non-contact sensor detects the rotation angle of the rotating member by detecting an azimuth of the magnetic flux that changes in accordance with the rotation of the rotating member. Between an end face of the permanent magnet and the metal plate, there is interposed a high impedance member that prevents radio wave noise from flowing from the metal plate to the permanent magnet.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
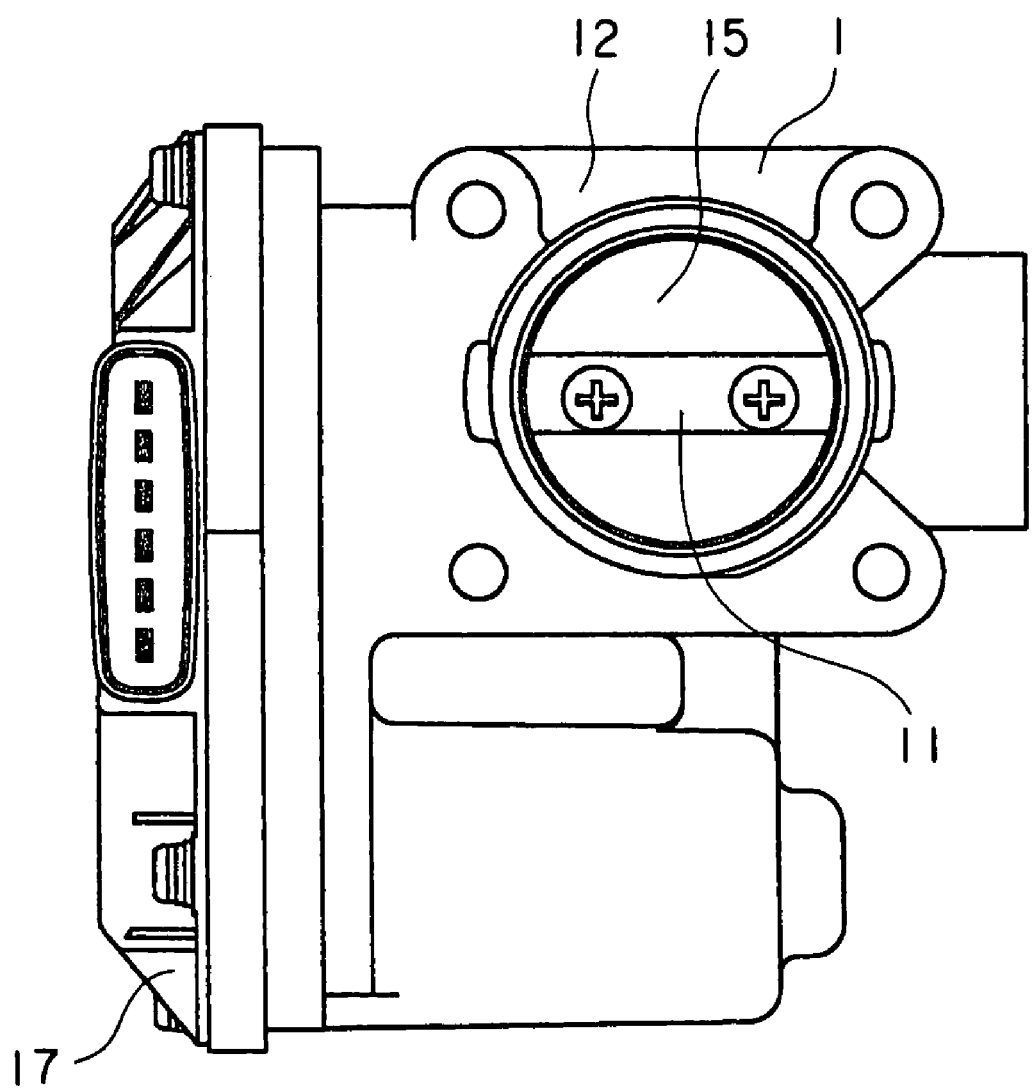
FIG. 1 is a front elevational view of an intake air control system for an engine into which a rotation angle detection apparatus according to a first embodiment of the present invention is built.

Now, preferred embodiments of the present invention will be described in detail while referring to the accompanying drawings. Throughout respective figures, the same or corresponding members or parts are identified by the same reference numerals and characters.

Embodiment 1

Figure 2:
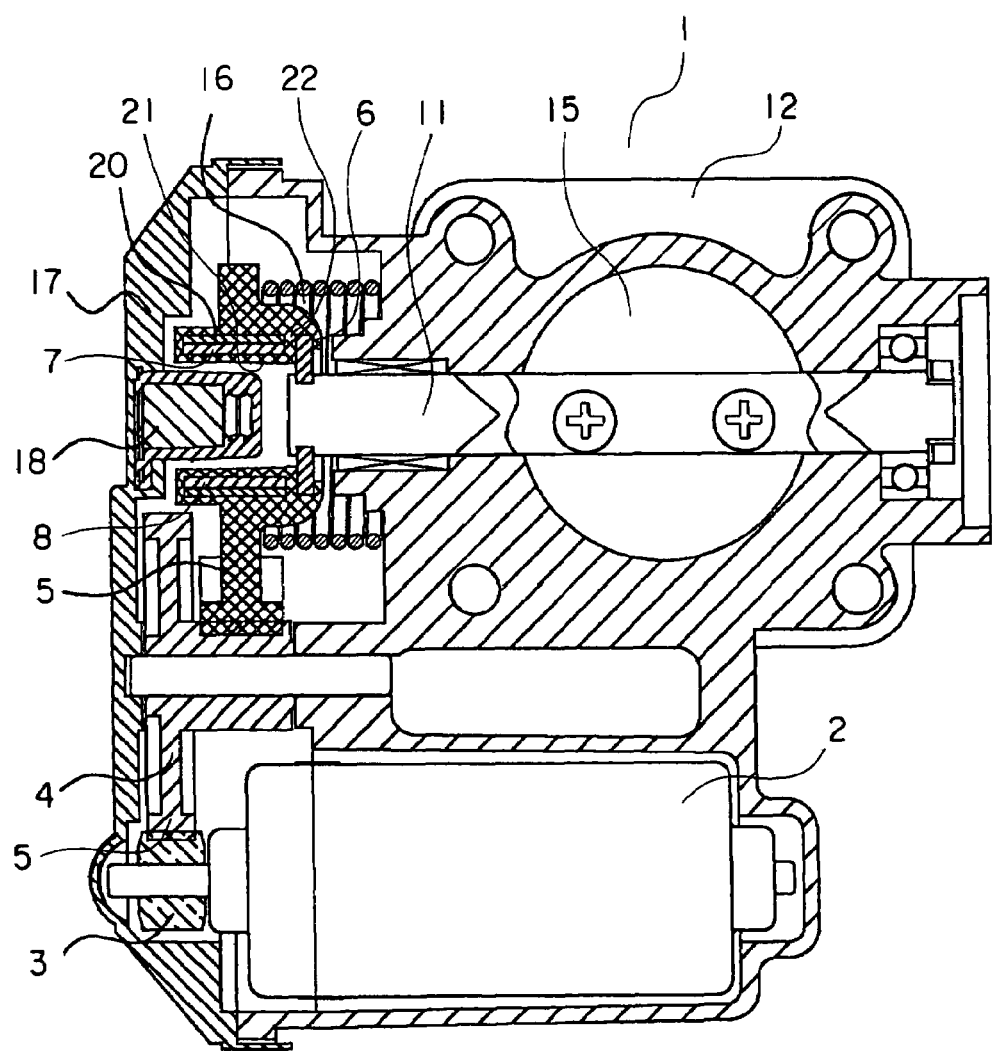
FIG. 2 is a cross sectional front view of the intake air control system for an engine in FIG. 1.

Referring to the drawings and first to FIG. 1, there is shown, in a front elevational view, an intake air control system 1 for an engine (hereinafter abbreviated as an intake air control system) into which a rotation angle detection apparatus according to a first embodiment of the present invention is built. FIG. 2 is a cross sectional front view of the intake air control system for an engine in FIG. 1.

In this intake air control system 1, a spur gear 3 is fixedly mounted on a rotation or output shaft of a drive motor 2 which is driven to rotate by direct current supplied thereto from an electric power supply (not shown). The spur gear 3 is in meshing engagement with a speed reduction gear 4 made of resin. A throttle gear wheel portion 5 of the insert molded body 20 is in meshing engagement with the speed reduction gear 4.

Figure 3:
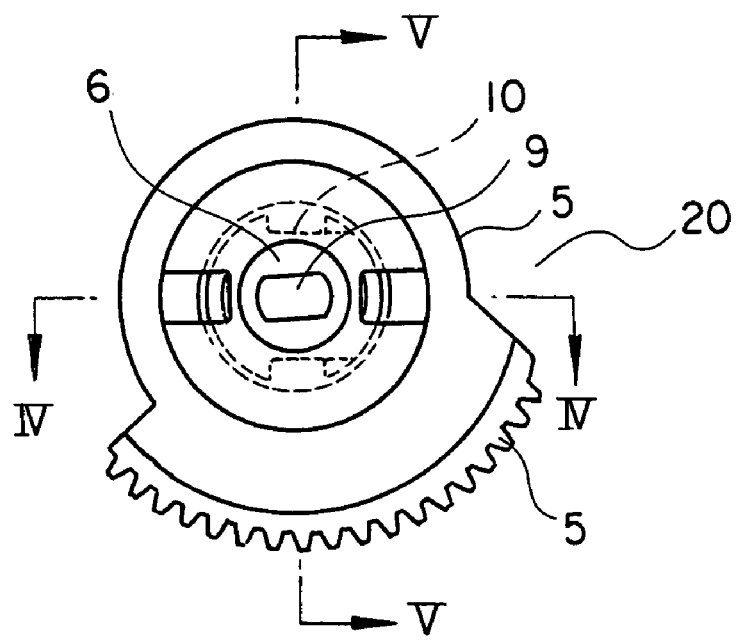
FIG. 3 is a front elevational view when an insert molded body of FIG. 2 is seen from a shaft side.
Figure 4:
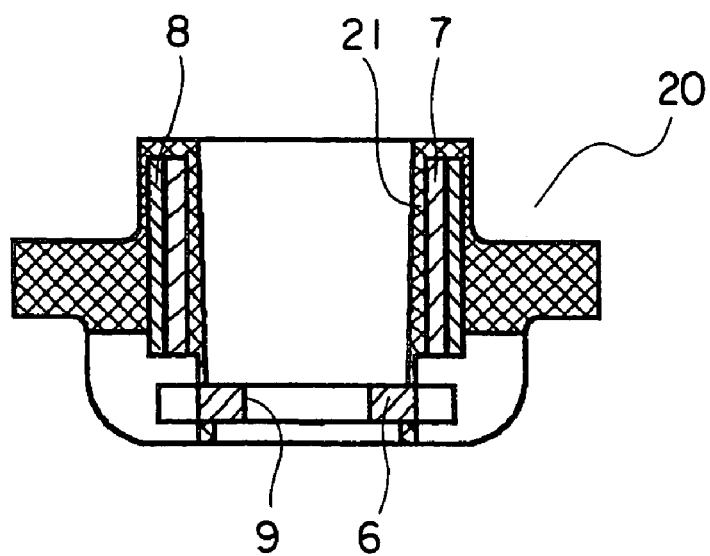
FIG. 4 is a cross sectional arrow view along line IV-IV of the insert molded body in FIG. 3.
Figure 5:
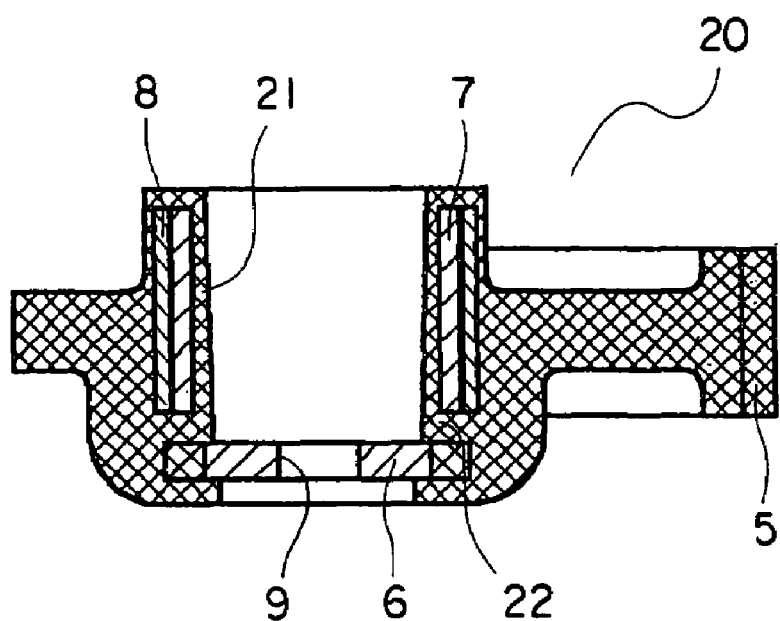
FIG. 5 is a cross sectional arrow view along line V-V in FIG. 3.

FIG. 3 is a front elevational view when the insert molded body 20 in FIG. 2 is seen from the right side. FIG. 4 is a cross sectional arrow view along line IV-IV of the insert molded body 20 in FIG. 3. FIG. 5 is a cross sectional arrow view along line V-V of the insert molded body in FIG. 3.

Figure 6:
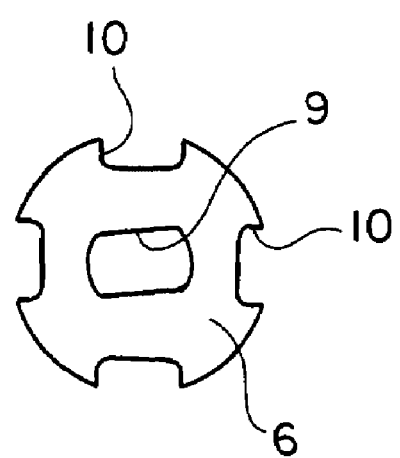
FIG. 6 is a front elevational view of a metal plate in FIG. 2.
Figure 7:
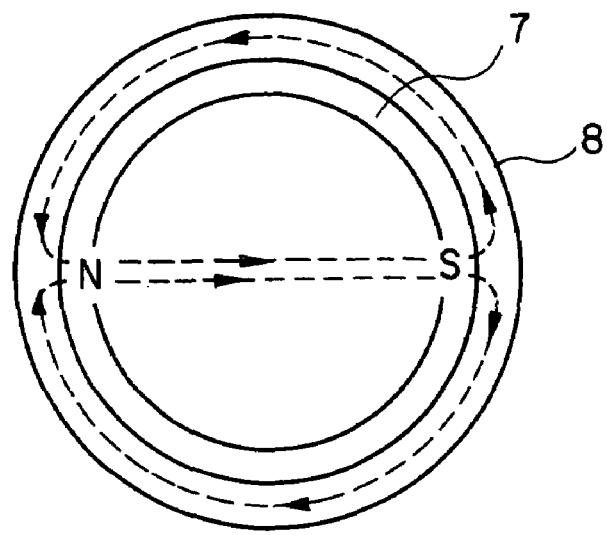
FIG. 7 is a front elevational view showing a permanent magnet and a yoke in FIG. 2.

This insert molded body 20 has a metal plate 6 shown in FIG. 6, a permanent magnet 7 of a cylindrical shape shown in FIG. 7, and a yoke 8 of a cylindrical shape that is in surface contact with the outer peripheral surface of the permanent magnet 7, all of which are integrated with one another by insert molding. In addition, the insert molded body 20 has the sector-shaped throttle gear wheel portion 5 formed on the outer periphery thereof.

A resin forming the throttle gear wheel portion 5 is interposed between the end faces of the permanent magnet 7 and the yoke 8 and the metal plate 6 to form a high impedance member 22, and also covers the inner wall surface of the permanent magnet 7 thereby to form a protective layer 21.

The metal plate 6 has notched portions 10 formed at four locations at equal intervals, and at the same time has an oval-shaped hole 9 in the central portion thereof.

The notched portions 10 function as positioning members for the metal plate 6 in a molding die when the permanent magnet 7 and the yoke 8 are integrated with the metal plate 6 by means of insert molding. Accordingly, the molding die enters the notched portions 10, and the end faces of the permanent magnet 7 and the yoke 8 are exposed in the notched portions 10 without being covered with the resin, as shown in FIG. 4. Here, note that the throttle gear wheel portion 5 is formed in a peripheral edge portion protruded in a radial direction from the yoke 8, i.e., in regions away from the notched portions 10, as shown in FIG. 3.

The metal plate 6 is fixedly secured to the shaft 11 by fitting its hole 9 into an end of the shaft 11, which has been beforehand formed so as to be inserted by the hole 9, and by caulking and crushing the shaft end. The shaft 11 is rotatably supported by a body 12 having an intake passage formed therein through a first bearing 12 and a second bearing 14. A throttle valve 15 is fixedly mounted on the shaft 11. This throttle valve 15 is always urged in a direction to close the intake passage in the body 12 under the resilient force of a spring 16.

At one side surface of the body 12, there is arranged a cover 17 that serves to cover the spur gear 3, the speed reduction gear 4, and the throttle gear wheel portion 5. Integrated with this cover 17 by means of insert molding is a non-contact sensor 18 that constitutes the rotation angle detection apparatus together with the permanent magnet 7 and the yoke 8.

The non-contact sensor 18 is arranged on the axis of the shaft 11, and on the center line of an inner space of the cylindrical permanent magnet 7.

As shown in FIG. 7, the magnetic flux of the permanent magnet 7 flows from an N pole thereof to an S pole thereof through the inner space of the permanent magnet 7, and branches to the left and right at the S pole to further flow through semicircular paths in the yoke 8 to return to the original N pole.

The non-contact sensor 18 is composed of a magnetic detection section (not shown) with a magnetoresistive element built therein for detecting the rotation angle of the shaft 11 by detecting the direction of the magnetic flux, and an output calculation section (not shown) for processing an output signal from the magnetic detection section.

In the intake air control system of the above-mentioned construction, when the driver depresses an accelerator pedal, an accelerator opening signal of an accelerator opening sensor (not shown) is input to an engine control unit (hereinafter referred to as "ECU"). The ECU energizes the drive motor 2 in such a manner that the output or rotating shaft of the drive motor 2 is driven to rotate so as to move the throttle valve 15 to a prescribed degree of opening. Together with the rotation of the rotating shaft of the drive motor 2, the spur gear 3, the speed reduction gear 4, and the throttle gear wheel portion 5 are driven to rotate. As a result, the shaft 11 formed integral with the throttle gear wheel portion 5 is rotated by a predetermined rotational angle, whereby the throttle valve 15 is held at a predetermined rotational angle in the intake passage formed in the body 12.

On the other hand, in the non-contact sensor 18 of a magnetic flux azimuth detection type, the magnetic detection section thereof detects the azimuth of the magnetic flux lines from the permanent magnet 7 that rotates integrally with the shaft 11. An output signal from the magnetic detection section is processed by the output calculation section, and then is sent to the ECU as a throttle opening signal of the throttle valve 15, so that based on the throttle opening signal, the ECU determines how much fuel is to be injected into each cylinder of the engine. The operating or rotational range of the magnetic flux lines is in a range from 0 degrees, at which the throttle valve 15 is fully closed, to 90 degrees, at which the throttle valve 15 is fully opened, and in this range, the non-contact sensor 18 linearly responds to the rotational angle of the throttle valve 15.

As described in the foregoing, according to the rotation angle detection apparatus of this first embodiment, between the metal plate 6 and the individual end faces of the yoke 8 and the permanent magnet 7, there is interposed an air space (gap) or the high impedance member 22 made of resin for preventing radio wave noise from flowing from the metal plate 6 to the yoke 8 and the permanent magnet 7, whereby there is no fear that the individual end faces of the yoke 8 and the permanent magnet 7 might be placed in contact with the metal plate 6.

Accordingly, it is possible to avoid a situation where an eddy current generated in the body 12 or radio wave noise from the drive motor 2 is transmitted to the yoke 8 and the permanent magnet 7 through the shaft 11 and the metal plate 6, and thence to the non-contact sensor 18 as it is through radiation.

In addition, the resin becomes a magnetic air gap, so it is possible to suppress leakage of the magnetic flux from the permanent magnet 7 to the metal plate 6 to a low level. Accordingly, the metal plate 6 may be made of an inexpensive ferrous or iron material instead of a non-magnetic material so as to reduce the cost for materials to be used.

Moreover, the metal plate 6 is formed on its peripheral edge with the notched portions 10 which serve as positioning members with respect to the molding die at the time of insert molding, whereby the diametral positioning of the yoke 8 and the permanent magnet 7 is effected through the metal plate 6 in the molding die. As a result, the metal plate 6, the yoke 8 and the permanent magnet 7 the insert molded body 20 thus insert molded are set at their prescribed positions with ease.

Further, the throttle gear wheel portion 5 of the insert molded body 20 is formed in a region remote from the notched portions 10 when viewed along the axial direction of the shaft 11. As a consequence, even if shrinkage of the resin, etc., occurs at the notched portions 10, there will be substantially no adverse effect on the throttle gear wheel portion 5.

In addition, the resin is interposed in the notched portions 10 of the metal plate 6 which do not serve for the positioning of the molding die, so the circumferential rotation of the metal plate 6 is prevented by the resin.

Further, the protective layer 21 covered with the resin is formed on the inner peripheral surface of the permanent magnet 7. Accordingly, when the insert molded body 20 is formed, there will be no direct sliding friction between the molding die and the permanent magnet 7, so neither damage to the inner peripheral surface of the permanent magnet 7 nor wear of the molding die will not occur. In addition, an impactive force from the outside to the permanent magnet 7 is alleviated by the protective layer 21, so the damage of the permanent magnet 7 is reduced.

Embodiment 2

Figure 8:
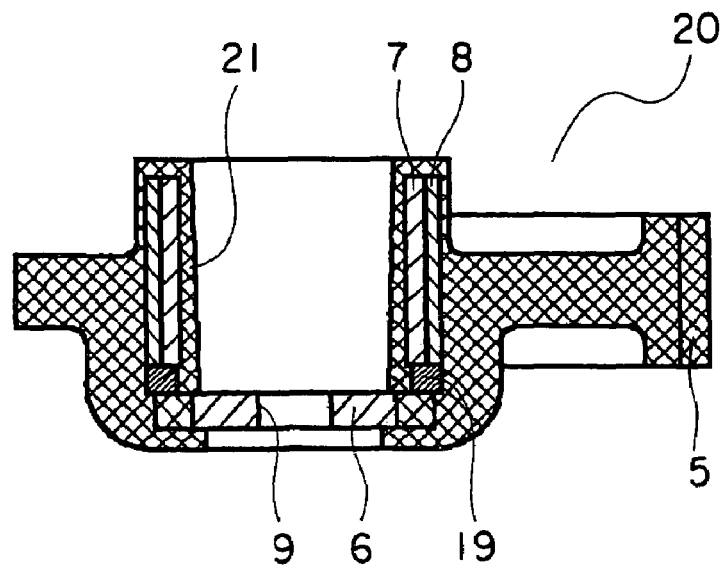
FIG. 8 is a cross sectional view of an insert molded body according to a second embodiment of the present invention.

FIG. 8 is a cross sectional view of an insert molded body 20 according to a second embodiment of the present invention.

In this second embodiment, a ring-shaped ferrite plate 19, being a high impedance member, is interposed between a metal plate 6 and the individual end faces of a yoke 8 and a permanent magnet 7. The other construction of this second embodiment is similar to that of the first embodiment.

According to this intake air control system, when radio wave noise from outside flows from the metal plate 6 to the yoke 8 and the permanent magnet 7, high-frequency current is consumed by the ferrite plate 19. Accordingly, it becomes more difficult for the radio wave noise from outside to transmit to the yoke 8 and the permanent magnet 7. In particular, if the ferrite plate 19 with its impedance being high in a high frequency region in which radio wave noise is intended to be reduced is used, it functions as a selective noise filter. The operation and effects of this second embodiment other than the above are similar to those of the first embodiment.

In the above-mentioned first and second embodiments, reference has been made to a rotation angle detection apparatus built into an intake air control system for an engine that detects the degree of opening of a throttle valve, but it is of course needless to say that the present invention can also be applied to an apparatus that detects the rotation angle of a variety of rotating members other than this one.

In addition, on the outer periphery of the permanent magnet 7, the yoke 8 has been arranged which functions as a magnetic path and serves to reduce the amount of leakage of magnetic flux to the outside, but the present invention can also be applied to a rotation angle detection apparatus unprovided with the yoke 8.

While the invention has been described in terms of preferred embodiments, those skilled in the art will recognize that the invention can be practiced with modifications within the spirit and scope of the appended claims.

What is claimed is:

1. A rotation angle detection apparatus comprising:
   a permanent magnet of a cylindrical shape in which magnetic flux flows from its N pole to its S pole through an inner space thereof;
   a metal plate that is fixedly secured to a rotating member and is integrated with said permanent magnet through a resin by means of insert molding; and
   a non-contact sensor that is arranged in said inner space of said permanent magnet;
   wherein said non-contact sensor detects the rotation angle of said rotating member by detecting an azimuth of said magnetic flux that changes in accordance with the rotation of said rotating member; and
   between an end face of said permanent magnet and said metal plate, there is interposed a high impedance member that prevents radio wave noise from flowing from said metal plate to said permanent magnet.

2. The rotation angle detection apparatus as set forth in claim 1, wherein on the outer periphery of said permanent magnet, there is arranged a yoke of a cylindrical shape that is in surface contact with an outer peripheral wall surface of said permanent magnet.

3. The rotation angle detection apparatus as set forth in claim 1, wherein said high impedance member comprises said resin.

4. The rotation angle detection apparatus as set forth in claim 1, wherein said high impedance member comprises a ferrite plate.

5. The rotation angle detection apparatus as set forth in claim 1, wherein said metal plate is formed on its peripheral edge with a notched portion which serves as a positioning member with respect to a molding die at the time of said insert molding.

6. The rotation angle detection apparatus as set forth in claim 5, wherein a gear wheel portion is formed on an insert molded body that has said permanent magnet and said metal plate insert molded therewith, and said gear wheel portion is formed in a region remote from said notched portion when viewed along an axial direction of said rotating member.

7. The rotation angle detection apparatus as set forth in claim 1, wherein a protective layer covered with said resin is formed on an inner peripheral surface of said permanent magnet.

8. The rotation angle detection apparatus as set forth in claim 6, wherein said gear wheel portion of said insert molded body comprises a throttle gear wheel portion that is driven to rotate by a drive motor, and a throttle valve for adjusting an amount of air to be supplied to an engine is operated by the rotation of said throttle gear wheel portion.

* * * * *